US005285011A

United States Patent [19]

Shimochi

[11] Patent Number: 5,285,011

[45] Date of Patent: Feb. 8, 1994

[54] JOINT TERMINAL MOUNTING STRUCTURE FOR ELECTRIC JUNCTION BOX

[75] Inventor: Eiji Shimochi, Shizuoka, Japan

[73] Assignee: Yazaki Corporation, Tokyo, Japan

[21] Appl. No.: 734,664

[22] Filed: Jul. 23, 1991

[30] Foreign Application Priority Data

Aug. 6, 1990 [JP] Japan .............................. 2-82764[U]

[51] Int. Cl.[5] .............................................. H02G 3/08

[52] U.S. Cl. .............................. 174/52.1; 174/138 F; 439/76; 439/621

[58] Field of Search .................... 174/138 F, 50, 50.6, 174/52.1, 53, 54, 59; 439/76, 205, 278, 281, 206, 282, 283, 34, 271, 519, 521, 548, 556, 559, 587, 589, 621, 901, 904; 361/399

[56] References Cited

U.S. PATENT DOCUMENTS

| | | | |
|---|---|---|---|
| 4,238,140 | 12/1980 | Cairns et al. | 439/621 X |
| 4,689,718 | 8/1987 | Maue et al. | 439/76 X |
| 4,772,759 | 9/1988 | Roy et al. | 174/52.1 |
| 4,830,621 | 5/1989 | Maue et al. | 439/52 |
| 4,871,884 | 10/1989 | Hayashi | 174/52.1 |
| 4,940,419 | 7/1990 | Kurita et al. | 439/271 |
| 4,959,018 | 9/1990 | Yamamoto et al. | 174/52.1 X |
| 5,011,417 | 4/1991 | Matsumoto et al. | 439/76 |
| 5,023,752 | 6/1991 | Detter et al. | 361/399 |

FOREIGN PATENT DOCUMENTS

| | | |
|---|---|---|
| 0255204 | 2/1988 | European Pat. Off. . |
| 0262685 | 4/1988 | European Pat. Off. . |
| 62-109378 | 7/1987 | Japan . |
| 1434312 | 5/1976 | United Kingdom . |
| 2210212 | 6/1989 | United Kingdom . |

*Primary Examiner*—Lincoln Donovan
*Assistant Examiner*—Hyung S. Sough
*Attorney, Agent, or Firm*—Nikaido Marmelstein Murray & Oram

[57] ABSTRACT

A joint terminal mounting structure for an electric junction box incorporates a junction box body having at least one terminal portion connected to at least one joint terminal; a joint terminal accommodating box having at least one joint terminal accommodating cavity; and a cover adapted to cover the joint terminal accommodating box. Since the present device uses a joint terminal accommodating box, joint terminals can be securely connected with ease, resulting in improved work efficiency and reliable electrical connections. Further, since the present device has a structure in which the cover is incorporated in the joint terminal accommodating box, the projecting height of the cover is suppressed to improve resin moldability, thereby resulting in improved mold life and yield.

6 Claims, 7 Drawing Sheets

JOINT TERMINAL MOUNTING STRUCTURE FOR ELECTRIC JUNCTION BOX

BACKGROUND OF THE INVENTION

1. Field of the Invention

The present invention relates to a structure of an electric junction box accommodating joint terminals.

2. Description of the Prior Art

FIG. 8 shows a joint terminal mounting structure for an electric junction box for connecting plug-in-type fuses. In the figure, reference numeral 62 shows a junction box body. On the junction box body 62 are accumulated a plurality of circuit boards 63, and a bus bar terminal (tab terminal portion) 65 of each circuit board 64 projects on the surface of the circuit board 63. To the bus bar terminal 65 is connected an electric contact portion 67 of a female-to-female joint terminal 66.

Further, reference numeral 69 shows a cover made of synthetic resin and a fuse block 71 is integrally formed with the cover 69. In the fuse block 71 is formed an accommodating cavity (not shown) for the female-to-female joint terminals 66, and on the block is formed fuse insertion openings 70. Then, the junction box body 62 is covered by the cover 69 and a fuse 72 is mounted to connect a fuse terminal 73 to an upper electric contact portion 68 of the female-to-female joint terminal 66.

Then, in consideration of work efficiency to draw out the fuse, it is necessary to increase the height h in accordance with the mounting place of the electric junction box E. In such a case, a long female-to-female joint terminal 74, which is illustrated by the two dot chain line, is used.

However, in the conventional structure described above, connecting work for the bus bar terminal 65 to the female-to-female joint terminal 66 is troublesome. Besides, there is a problem that the female-to-female joint terminal 66 is apt to be insufficiently inserted, resulting in imperfect contact between the joint terminal 66 and the bus bar terminal 65. Further, in case that the long female-to-female joint terminal 74 is used, as shown in FIG. 9, when the angle between the joint terminal and the bus bar terminal 65 does not become substantially a right angle, there is a problem that the tip 75 of the contact portion is considerably inclined to interfering with the fuse block 71. This causes the cover 69 not to be assembled. Moreover, increasing the height of the fuse block 71 makes it difficult to carry out resin molding.

SUMMARY OF THE INVENTION

The present invention has been accomplished to overcome the problem described above. Therefore an object of the present invention is to provide a joint terminal mounting structure for an electric junction box wherein not only a female-to-female joint terminal can be securely connected with ease but also resin molding for a fuse block portion (a cover) is carried out with ease.

In achieving the foregoing objective of the present invention, there is provided a junction box body having at least one terminal portion connected to at least one joint terminal; a joint terminal accommodating box having at least one joint terminal accommodating cavity; and a cover adapted to cover the joint terminal accommodating box, as a basic structure of the joint terminal mounting structure for an electric junction box.

The joint terminal mounting structure for an electric junction box according to the present invention can be applied to a joint terminal with the upper half thereof projecting from the joint terminal accommodating box.

BRIEF DESCRIPTION OF THE DRAWINGS

The foregoing objects and advantages will be better understood from the following description with reference to the accompanying drawings, in which.

DETAILED DESCRIPTION OF PREFERRED EMBODIMENTS

Figure 1:
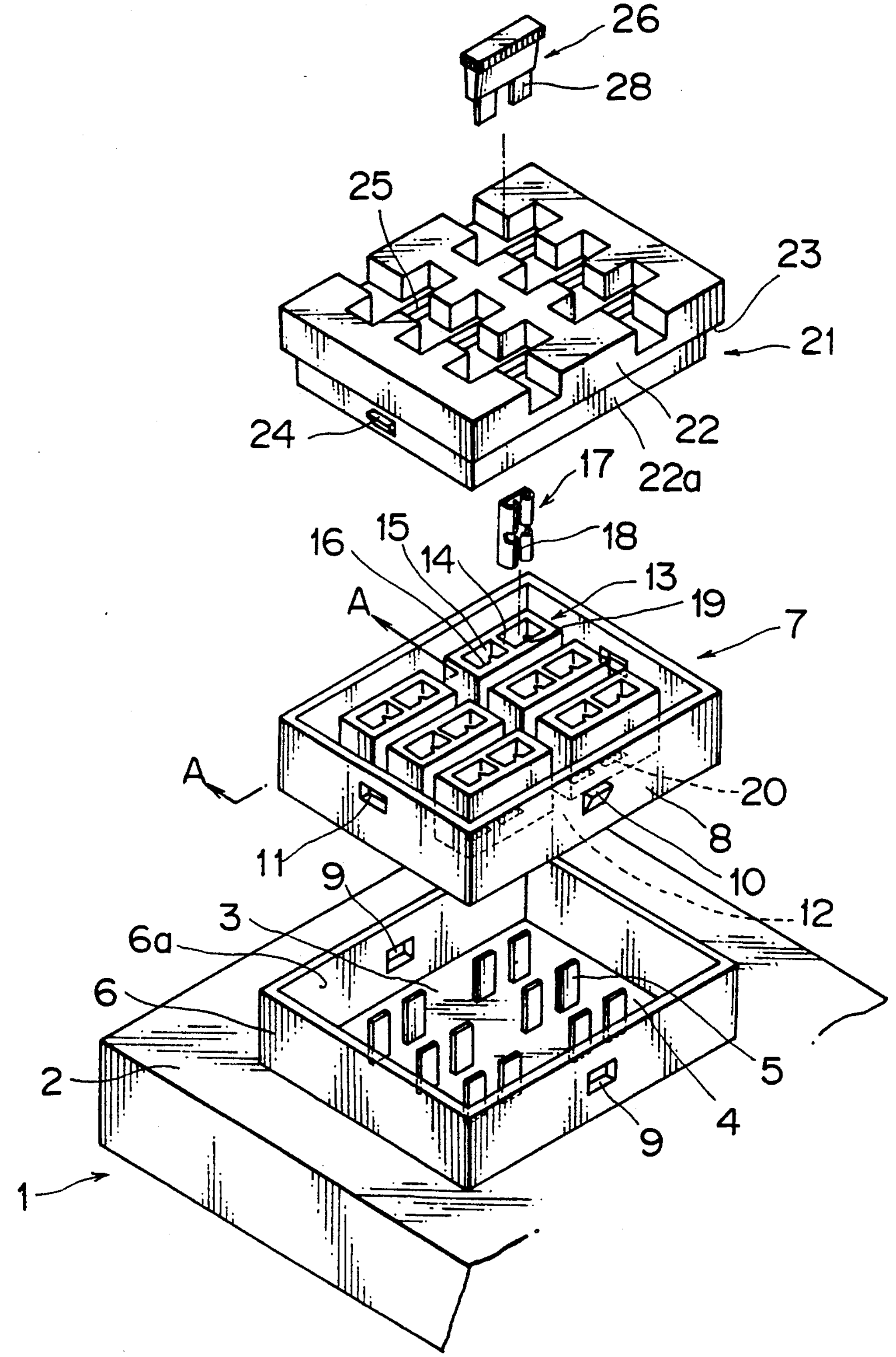
FIG. 1 shows an exploded perspective view of a device according to one embodiment of the present invention.

FIG. 1 shows a joint terminal mounting structure for an electric junction box according to one embodiment of the present device. In the figure, denoted 1 is a junction box body and the upper wall 2 thereof is provided with an opening 3. Bus bar terminals 5 of a circuit board 4 projects in the opening 3, and around the periphery of the opening 3 is provided a frame-shaped housing wall 6.

Denoted 7 is a joint terminal accommodating box made of synthetic resin, which is embedded inside the housing wall 6, and on the outer wall of the accommodating box 7 is provided a pair of engagement projections 10 to be engaged with engagement holes 9 on the inside wall 6*a* of the housing, and a pair of engagement holes 11 to be engaged with a cover 21 described below.

Inside the accommodating box 7 are provided a plurality of terminal accommodating portions 13 and at the middle of the terminal accommodating portion 13 is provided a center wall 14 to form two terminal accommodating cavities 15. On the inner wall 16 of the terminal accommodating cavity is provided a guide portion 19 for a middle concave portion 18 of a female-to-female joint terminal 17 and on the bottom wall 12 thereof is provided insertion holes 20 for the bus bar terminals 5.

Further, denoted 21 is a cover made of synthetic resin to be embedded to the upper portion of the accommodating box 7 and on the periphery wall 22 of the cover is formed a stop shoulder 23 and on the lower periphery wall 22*a* are provided engagement projections 24 to be engaged with the engagement holes 11 of the accommodating box 7. On the cover 21 are provided a plurality of fuse insertion holes 25 which lead to the terminal accommodating cavities 15.

Figure 2:
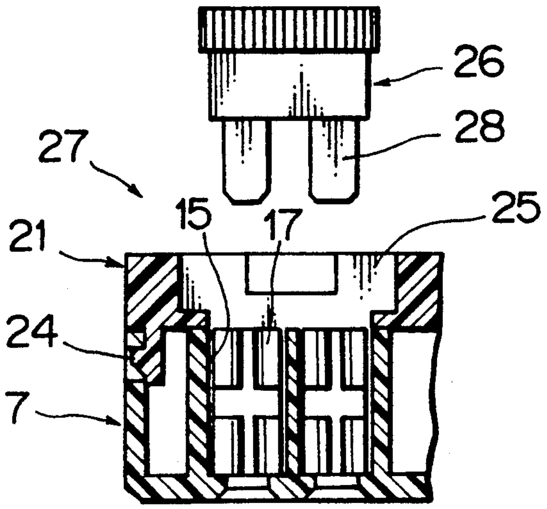
FIG. 2 shows a cross section taken along the line A—A of FIG. 1.

As shown is FIG. 2 showing the cross sectional view taken along the line A—A of FIG. 1, in the accommodating cavities each of the accommodating box 7 is inserted the female-to-female joint terminal 17. The accommodating box 7 is covered by the cover 21 and a fuse is inserted in the fuse insertion hole to form a fuse block assembly 27. The bus bar terminal 5, the female-to-female joint terminal 17 and the fuse terminal 28 are securely connected with each other with ease by assembling the fuse block assembly 27 into the junction box body 1. Further, in this embodiment, the fuse block assembly 27 can be used commonly for a variety of junction box bodies, causing a reduction in production cost.

Figure 3:
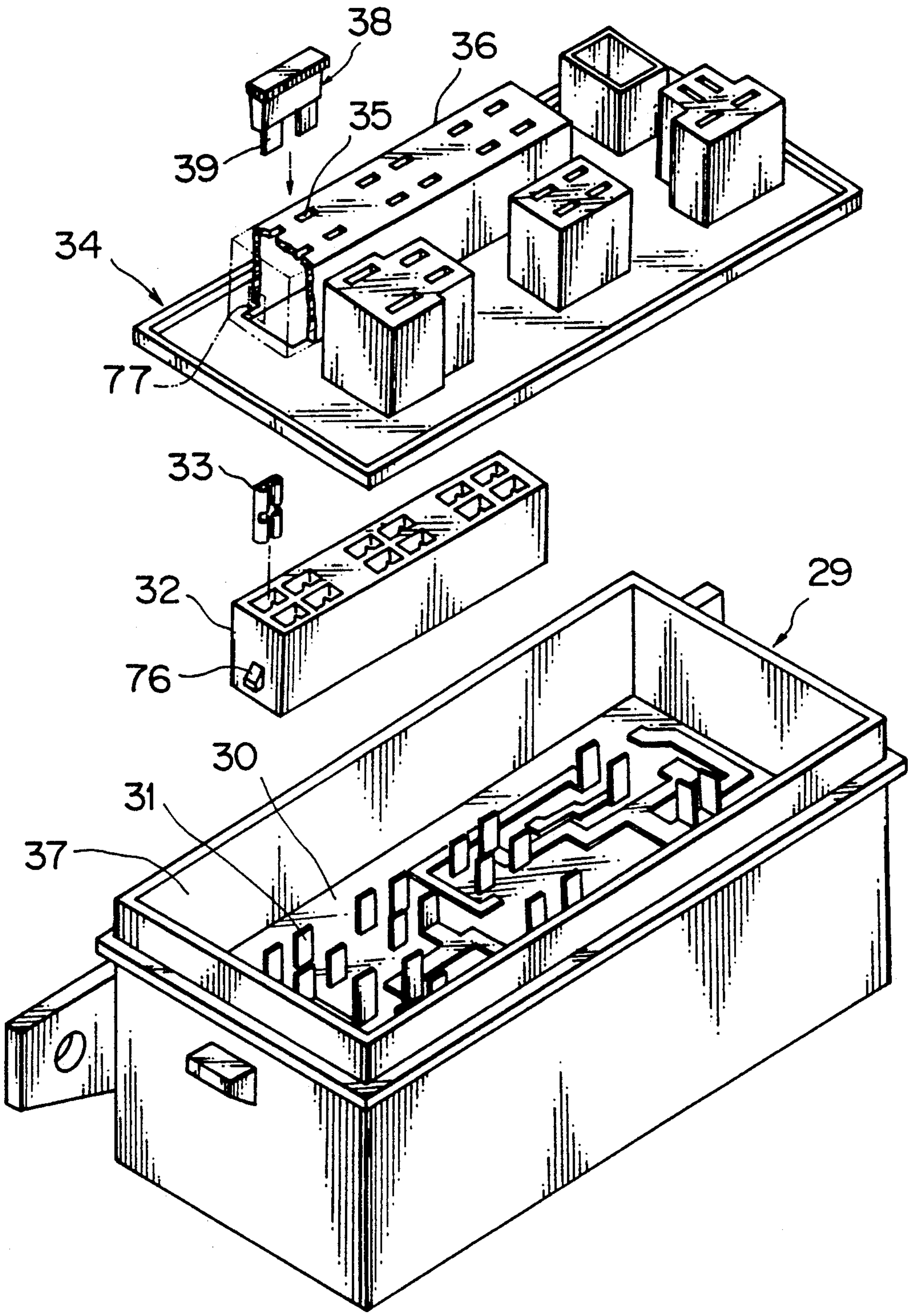
FIG. 3 shows an exploded perspective view of a device according to another embodiment of the present invention.

FIG. 3 shows a joint terminal mounting structure for an electric junction box according to another embodiment of the present invention.

In the figure, reference numeral 29 is a junction box body in which bus bar terminals 31 projects on a terminal board 30. Denoted 32 is a joint terminal accommodating box for accommodating female-to-female joint terminals 33. Denoted 34 is a cover which is integrally formed with a hollow fuse block 36 having fuse insertion openings 35. In the fuse block 36 of the cover 34, the joint terminal accommodating box 32 is embedded after accommodating the female-to-female joint terminals 33. Engagement projections 76 of the joint terminal accommodating box 32 engage with engagement holes 77. Then, the cover 34 and all are embedded in the junction box body 29 along the inner wall thereof 37 to connect the bus bar terminals and female-to-female joint terminals 33 to each other. Finally, the fuses 38 are inserted in the insertion holes 35 to connect the bus bar terminals 31, the female-to-female joint terminals 33, and the fuse terminals 39 to each other.

Figure 4:
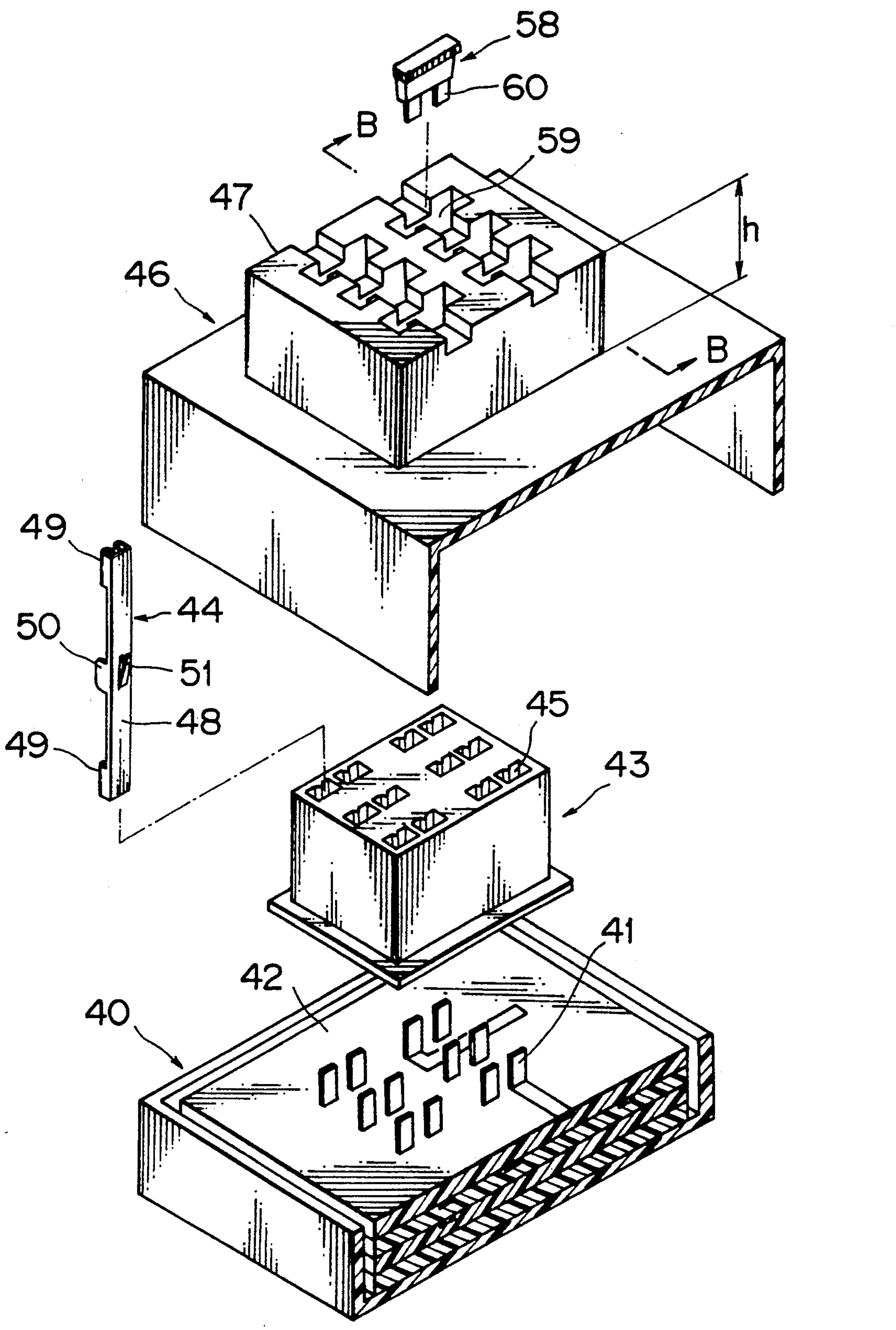
FIG. 4 shows an exploded perspective view of a device according to a further embodiment of the present device.

FIG. 4 shows a mounting structure of a long female-to-female joint terminal for an electric junction box.

In the figure, reference numeral 40 is a junction box body with a built-in circuit board 42 having projecting bus bar terminal 41. Denoted 43 is a joint terminal accommodating box having a plurality of accommodating cavities 45 for long female-to-female joint terminals 44. Numeral 46 shows a cover which is integrally formed with a fuse block 47 stacked on the accommodating box 43.

Figure 5A:
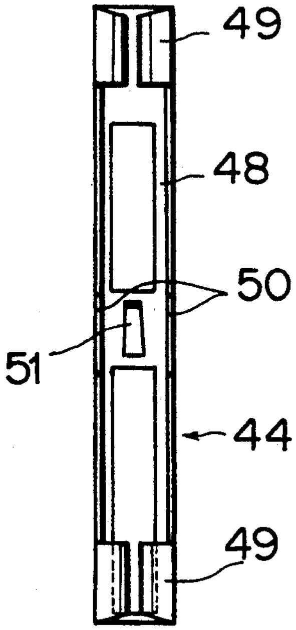
FIGS. 5A and 5B are a front view and a side view of the long female-to-female joint terminal, respectively.
Figure 5B:
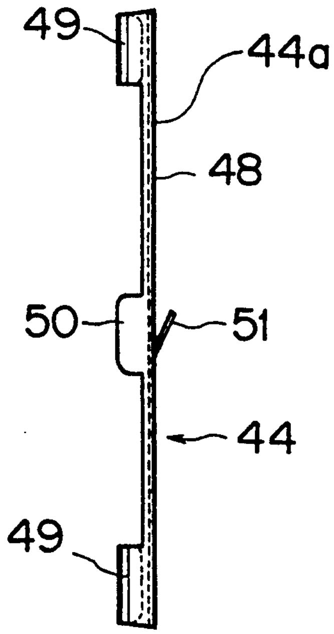

As shown in FIGS. 5A and 5B, the long female-to-female joint terminal 44 is provided with female electric contact portions 49 at both ends thereof, a pair of guide portions 50 longitudinally formed on one surface at the middle of a base plate thereof, and a resilient engagement piece 51 diagonally struck out on the other side.

Figure 6A:
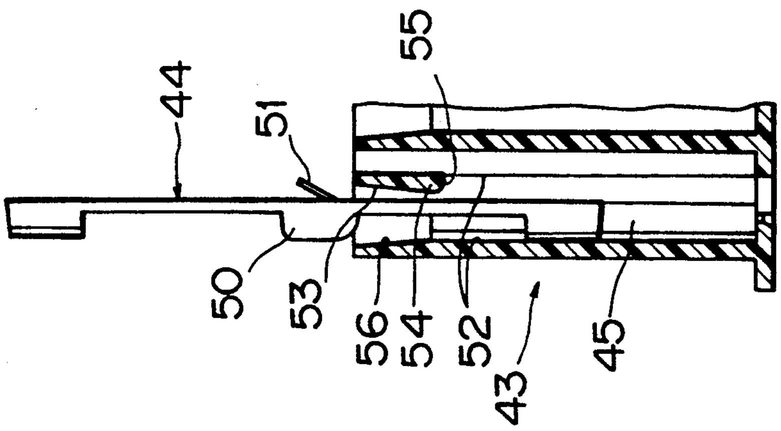
FIGS. 6A to 6C show the condition in which the long female-to-female joint terminal is inserted.
Figure 6B:
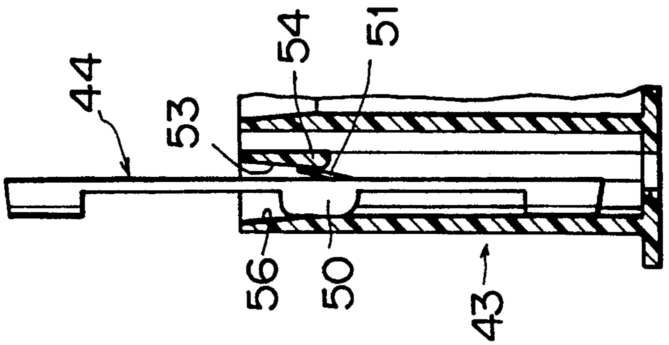
Figure 6C:
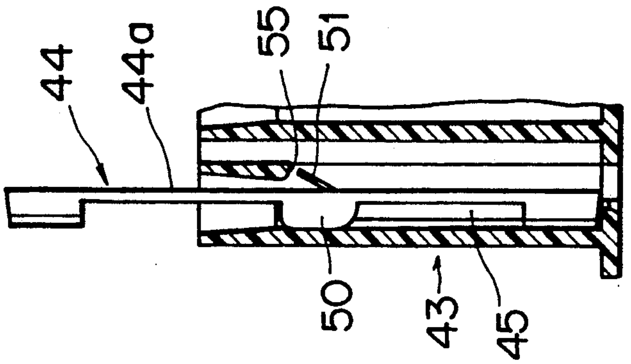

FIGS. 6A to 6C show the condition in which the long female-to-female joint terminal is inserted in the accommodating cavity 45 of the accommodating box 43.

On an inner wall adjacent to the inlet of the accommodating cavity 45 is provided a projection 54 having a taper guide surface 53 for the resilient engagement piece 51 of the long female-to-female joint terminal 44 to form an engagement shoulder 55, and another taper guide surface 56 opposing the projection 54 is formed. While the guide 50 of the long female-to-female joint terminal 44 slides along the taper guide surface 56, the resilient engagement piece 51 deforms while contacting with the taper guide surface 53 of the projection 54 (FIG. 6B). Then, on passing the projection 54, the resilient engagement piece is restored at the original position and is engaged with the engagement shoulder 15. Then, the long female-to-female joint terminal 44 is completely inserted in the accommodating cavity 45 with the upper half thereof projecting from the cavity (FIG. 6C).

Figure 7:
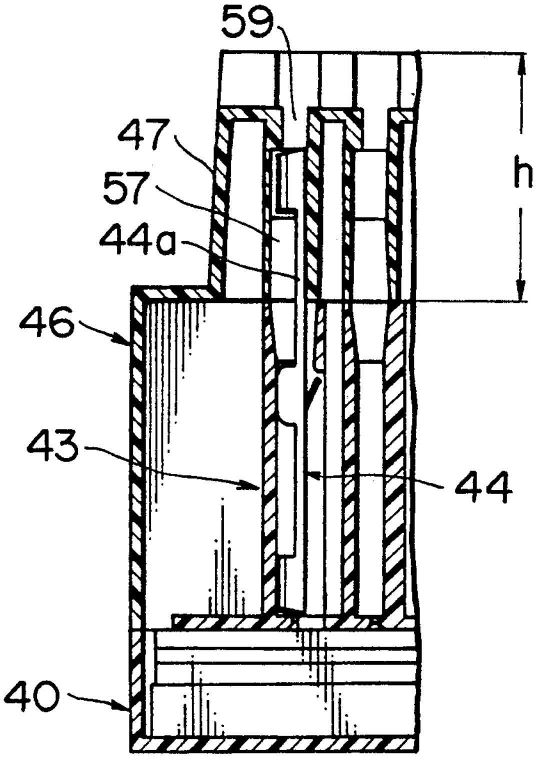
FIG. 7 shows a cross sectional view taken along the line B—B of FIG. 4 illustrating assembled state of the terminal.
Figure 9:
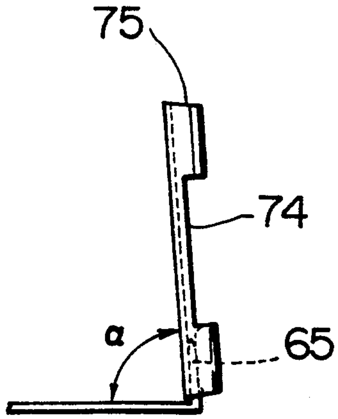
FIG. 9 PRIOR ART
FIG. 9 is a drawing explaining a problem on the conventional joint terminal mounting structure.
Figure 8:
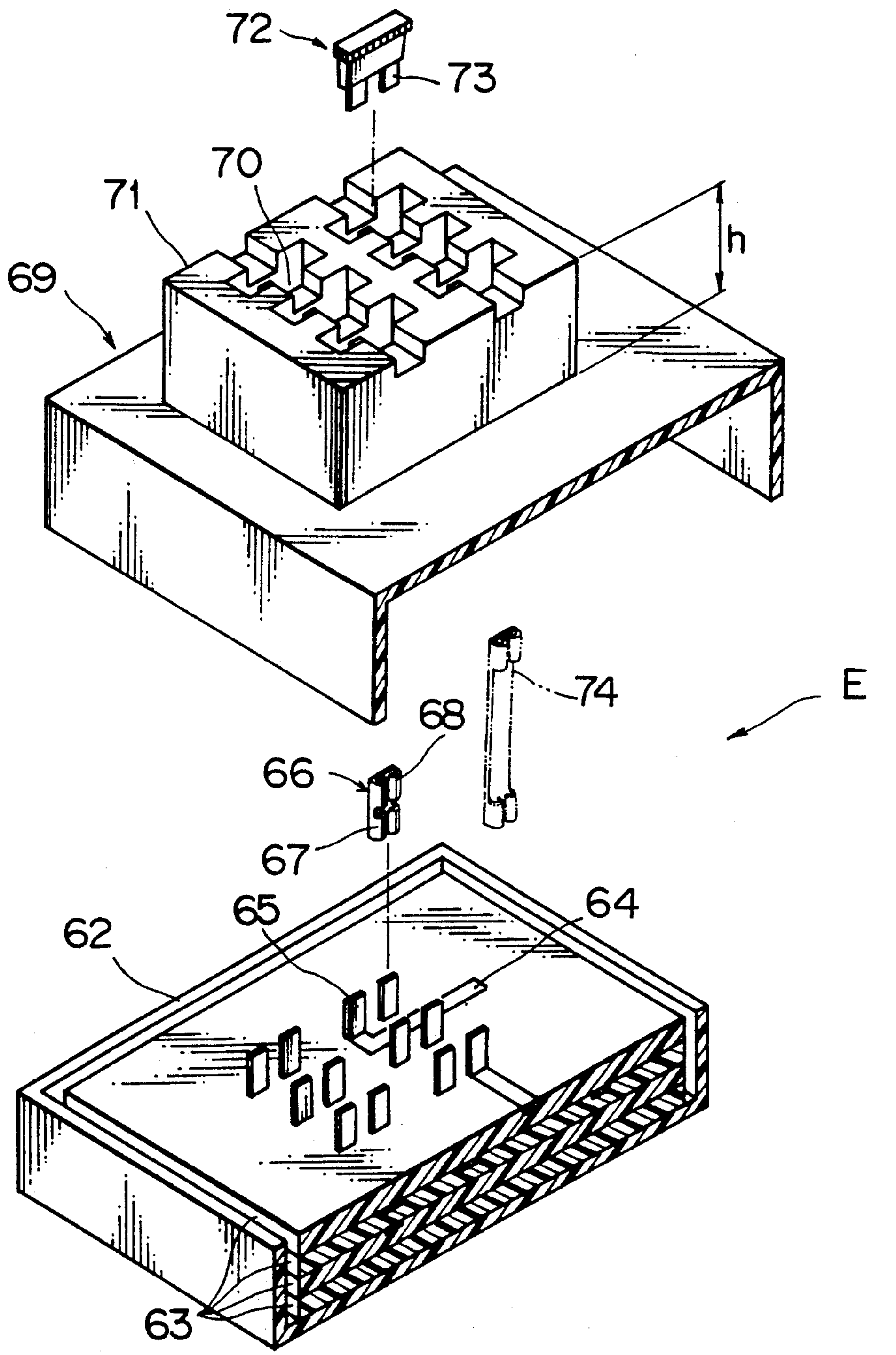
FIG. 8 PRIOR ART
FIG. 8 is an exploded perspective view of a conventional joint terminal mounting structure.

FIG. 7 shows the condition in which the cover 46 is fitted to the junction box body 40 on which the joint terminal accommodating box 43 is assembled. This figure shows the cross section taken along the line B—B of the FIG. 4. On the accommodating box 43 is fixed the fuse block 47 such that the fuse block 47 is laid to overlap the accommodating box. In the terminal insertion hole 59 of the fuse block 47 is accommodated the upper half 44a of the long female-to-female joint terminal 44. Then, the fuse 58 (refer to FIG. 4) is inserted in the insertion opening 59 to connect the bus bar terminal 41, the long female-to-female joint terminal 44, and the fuse terminal 60 to each other.

In the device according to the preferred embodiment described above, since the height of the fuse block portion 47 of the cover 46 can be reduced, resin molding work for the cover 46 can be carried out with ease. Further, since the long female-to-female joint terminal 44 is accommodated in the accommodating box 43 such that the inclination of the terminal in the vertical direction is restricted, the cover can be assembled smoothly without being interrupted by the long female-to-female joint terminal 44.

As described, since the present device uses a joint terminal accommodating box, joint terminals can be securely connected with ease, resulting in improved work efficiency and reliable electric connection. Further, since the present device has a structure in which the cover is incorporated in the joint terminal accommodating box, the projecting height of the cover (fuse block section) is suppressed to improve resin moldability, resulting in improved mold life and yield.

What is claimed is:

1. A joint terminal mounting structure for an electric junction box, comprising:

a junction box body having at least one terminal portion extending therefrom;

a joint terminal accommodating box having at least one joint terminal accommodating cavity, said joint terminal accommodating box being connected to said junction box body so as to positionally align the terminal portion with the joint terminal accommodating cavity;

at least one joint terminal operatively located in the joint terminal accommodating cavity so as to electrically connect with the terminal portion through the joint terminal accommodating cavity; and a cover having at least one insertion hole defined on a top surface thereof, said cover being adapted to cover said joint terminal accommodating box and positioned so as to connectively align said joint terminal in the joint terminal accommodating cavity with the insertion hole.

2. A joint terminal mounting structure for an electric junction box as claimed in claim 1, wherein said at least one joint terminal includes a base plate and female terminal portions each integrally formed with the base plate at both ends thereof.

3. A joint terminal mounting structure for an electric junction box as claimed in claim 2, wherein an upper half portion of said joint terminal projects from said joint terminal accommodating box.

4. A joint terminal mounting structure for an electric junction box as claimed in claim 2, wherein said junction box body is provided with a frame-shaped housing wall on the same surface of the junction box body that said at least one terminal portion is provided, and said joint terminal accommodating box is embedded inside the housing wall.

5. A joint terminal mounting structure for an electric junction box as claimed in claim 2, wherein said cover is provided with a fuse block integrally formed on said cover with the insertion hole being defined on a top surface of the fuse block, said joint terminal accommodating box being positionally connected to the fuse block so as to connectively align said joint terminal in the joint terminal accommodating cavity with the insertion hole.

6. A joint terminal mounting structure for an electric junction box as claimed in claim 5, wherein the at least one joint terminal accommodating cavity is provided with a guide projection on an inner wall thereof for guiding a concave portion of said joint terminal.

* * * * *